J. B. MEYERS.
Liquid-Mixer.
No. 165,853.
Patented July 20, 1875.
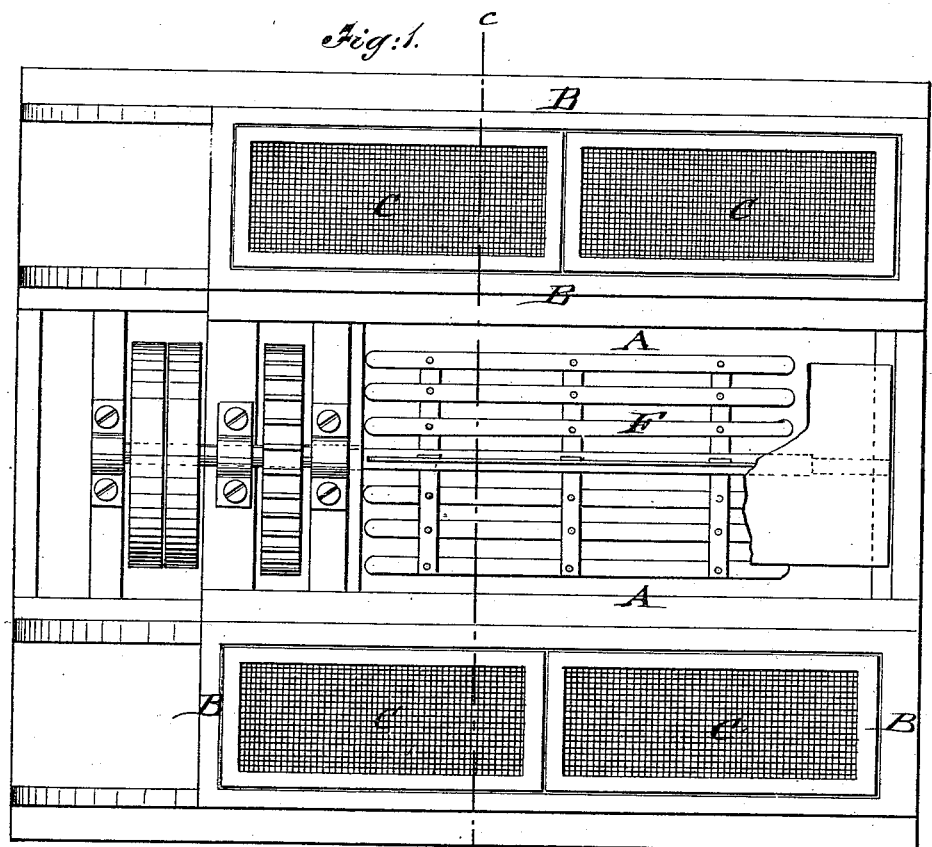
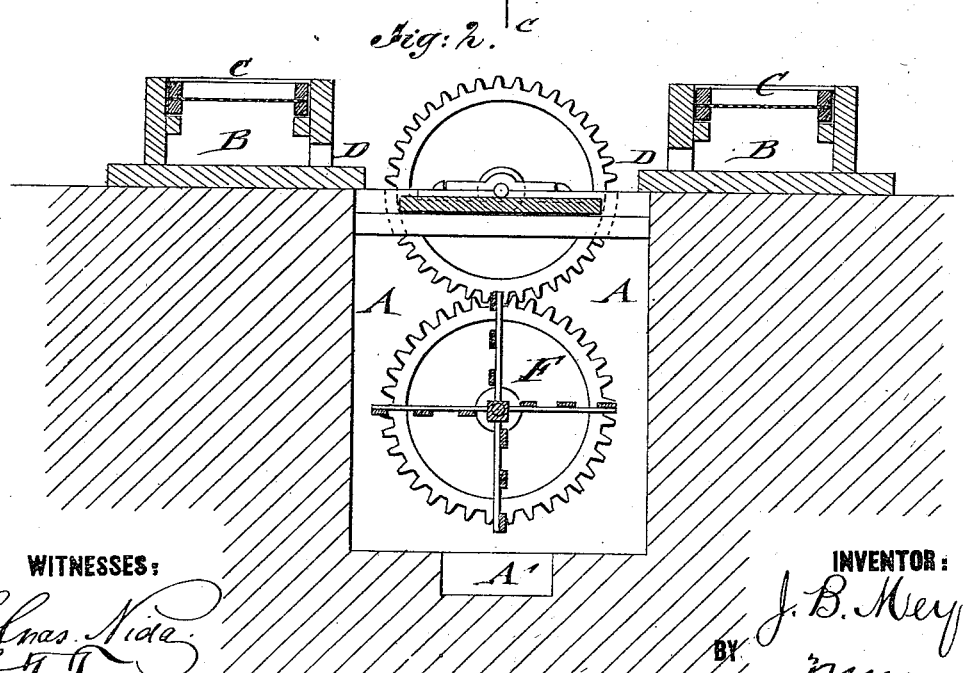

UNITED STATES PATENT OFFICE.

JOHN B. MEYERS, OF NEW ORLEANS, LOUISIANA.

IMPROVEMENT IN LIQUID-MIXERS.

Specification forming part of Letters Patent No. 165,853, dated July 20, 1875; application filed May 22, 1875.

*To all whom it may concern:*

Be it known that I, JOHN B. MEYERS, of New Orleans, in the parish of Orleans and State of Louisiana, have invented a new and Improved Liquid-Mixer, of which the following is a specification:

In the accompanying drawing, Figure 1 represents a top view, and Fig. 2 a vertical transverse section on the line $c\ c$, Fig. 1, of my improved liquid-mixer.

Similar letters of reference indicate corresponding parts.

My invention is mainly intended for the purpose of thoroughly mixing sirups, molasses, and other liquids in large quantities, so that the operation can be performed in a rapid and effective manner; and the invention consists of a main mixing vessel or vat, with a revolving paddle or stirrer wheel arranged therein, in connection with the strainer, vessels, or boxes through which the liquids pass before entering the vat.

In the drawing, A represents the mixing vessel or vat, which is either set into the ground or below the floor, or at any other suitable place in the refinery or factory.

At both sides of the vat are arranged, on the ground or floor, boxes B, with strainers C at the top, on which the different kinds of fluids are discharged by rolling the barrels or other packages on the top of the same and removing the bungs. Any fibrous matter or other impurities are strained off thereby, and the liquids conveyed over the preferably inclined bottom of the boxes B, and through issuing opening D at the inside, toward the mixing-vat, to the latter. A paddle or stirrer wheel, F, is arranged in longitudinal direction in the mixing-vat, and revolved therein by suitable power transmitted from the engine, to mix thoroughly the large quantity of molasses or other fluid collected in the vat. The stirrer-wheel is made with radial arms and longitudinal strips, or in any other approved manner, so that the liquids are powerfully stirred and mixed to one homogeneous mass. When the liquids are properly mixed, the stirrer-wheel is stopped and the contents are drawn off by a pump, with suction-strainer set into the draining-box A' at bottom of vat, or in any other suitable manner for further treatment. A foot-plank covers the vat to prevent the fluid from being thrown out during the process of mixing.

Large quantities of liquids may thus be handled easily and mixed in a short space of time, while being also strained from any coarser impurities on the passage to the mixing-vat.

Having thus described my invention, I claim as new and desire to secure by Letters Patent—

The combination, with a vat and rotary mixing-wheel, of a series of supply-boxes, B, having channel-ways leading into vat and discharging on the wheel, as and for the purpose described.

JOHN B. MEYERS.

Witnesses:
FRED. ZENGEL,
H. M. KIDD.